(12) United States Patent
Patino et al.

(10) Patent No.: US 7,626,365 B2
(45) Date of Patent: Dec. 1, 2009

(54) CHARGING SYSTEM AND METHOD

(75) Inventors: Joseph Patino, Pembroke Pines, FL (US); Marco Pulido, Miramar, FL (US); Russell L. Simpson, Miami, FL (US)

(73) Assignee: Motorola Inc., Schaumburg, IL (US)

( * ) Notice: Subject to any disclaimer, the term of this patent is extended or adjusted under 35 U.S.C. 154(b) by 62 days.

(21) Appl. No.: 10/722,804

(22) Filed: Nov. 26, 2003

(65) Prior Publication Data

US 2005/0110463 A1    May 26, 2005

(51) Int. Cl.
  *H02J 7/00* (2006.01)
  *H02J 7/14* (2006.01)
  *H02J 1/10* (2006.01)
  *H04M 1/00* (2006.01)

(52) U.S. Cl. .................. 320/138; 320/121; 320/123; 320/129; 455/573; 307/44; 307/81; 307/29

(58) Field of Classification Search .............. 320/121, 320/123, 129, 138, 125, 153, 106, 135, 128; 307/138; 455/573
See application file for complete search history.

(56) References Cited

U.S. PATENT DOCUMENTS 4,061,956 A * 12/1977 Brown et al. ............... 320/153
6,100,664 A *  8/2000 Oglesbee et al. ........... 320/125
6,972,542 B2 * 12/2005 Patino et al. ............... 320/106

* cited by examiner

*Primary Examiner*—Edward Tso
*Assistant Examiner*—Yalkew Fantu
(74) *Attorney, Agent, or Firm*—Larry Brown; Sylvia Chen

(57) ABSTRACT

The invention concerns a method (200) and system (100) for charging a battery (110). The method includes the steps of receiving (212) an input power supply signal (300), monitoring (216) the input power supply signal to determine when the input power supply signal reaches first and second predetermined thresholds (314, 316) and in response to the monitoring step, selectively controlling (217) a charging switch (122) that controls the flow of the input power supply signal to the battery. The controlling step can include activating (220) the charging switch when the input power supply signal reaches the first predetermined threshold and deactivating (226) the switch when the input power supply signal reaches the second predetermined threshold.

15 Claims, 3 Drawing Sheets

CHARGING SYSTEM AND METHOD

CROSS REFERENCE TO RELATED APPLICATIONS (Not Applicable)

BACKGROUND

1. Technical Field

This invention relates in general to charging systems and more particularly, to charging systems that rely on rectified charging currents.

2. Description of the Related Art

In today's marketplace, portable electronic devices have become ubiquitous. Because they are portable, nearly all of these devices include rechargeable batteries as their power supply. Such portable devices are equipped with a charger, which can be incorporated in the device or can be a stand-alone unit that can receive the portable device. In either embodiment, the charger typically receives an AC input signal and converts this signal to a DC signal, which is then fed to the cells of the battery. These types of chargers generally include a rectifier that rectifies the incoming AC signal.

A rectified signal, however, will have a series of voltage peaks and valleys. A capacitor is typically provided in the portable device to supply charging current to the battery as the signal decreases during the voltage valleys. Unfortunately, the capacitor must be relatively large to maintain the necessary voltage, which takes up valuable space in the portable device and adds to the expense of the device or charger.

SUMMARY OF THE INVENTION

The present invention concerns a method of charging a battery. The method includes the steps of receiving an input power supply signal, monitoring the input power supply signal to determine when the input power supply signal reaches first and second predetermined thresholds and in response to the monitoring step, selectively controlling a charging switch that controls the flow of the input power supply signal to the battery. The controlling step includes activating the switch when the input power supply signal reaches the first predetermined threshold and deactivating the switch when the input power supply signal reaches the second predetermined threshold.

In one arrangement, the method can be practiced in an electronic device that is powered by the battery and that includes a capacitor for maintaining a voltage to indicate that the electronic device is being charged. Practicing the method in the electronic device can reduce the minimum value of the capacitor as compared to the minimum value required of a second capacitor that is used to provide voltage to the battery when the input power supply signal drops below the second predetermined threshold. The method can also include the step of synchronizing with the controlling of the charging switch the control of a second switch that regulates current flow to a circuit. The second switch to the circuit can be activated when the charging switch is activated and deactivated when the charging switch is deactivated. As an example, the circuit can be a backlighting circuit.

In another arrangement, the method can further include the steps of performing the receiving, monitoring and controlling steps in a wireless charging system and rectifying the input power supply signal. In one embodiment of the invention, the magnitude of the second predetermined threshold can be higher than the magnitude of the first predetermined threshold.

The present invention also concerns a charging system for charging a battery. The system includes a coil for receiving an input power supply signal, a charging switch for controlling the flow of the input power supply signal to the battery and a controller. The controller can be programmed to monitor the input power supply signal to determine when the input power supply signal reaches first and second predetermined thresholds and in response to the monitoring process, selectively control the charging switch. The controller can selectively control the charging switch by activating the charging switch when the input power supply signal reaches the first predetermined threshold and by deactivating the switch when the input power supply signal reaches the second predetermined threshold. The system also includes suitable software and circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
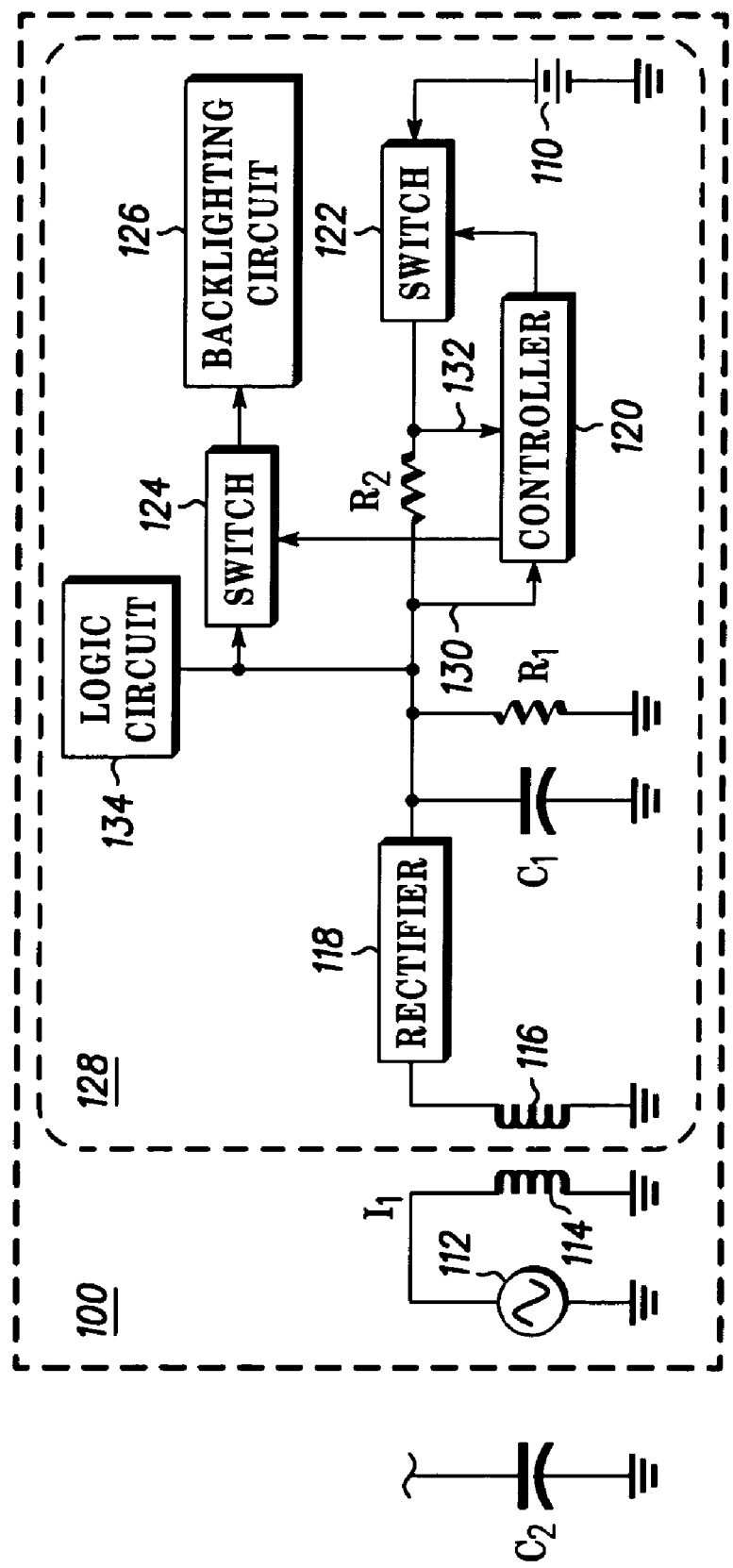
FIG. 1 illustrates a system for charging a battery in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

Referring to FIG. 1, a charging system 100 for charging a battery 110 is shown. The charging system 100 can include a power source 112, an inductor $I_1$ having a first coil 114 and a second coil 116, a rectifier 118, a capacitor $C_1$, a resistor $R_1$, a resistor $R_2$ and a controller 120. The charging system 100 can further include a charging switch 122 coupled to the battery 110, a second switch 124 and a backlighting circuit 126 in which the second switch 124 is coupled to the backlighting circuit 126. The controller can control the operation of the charging switch 122 and the second switch 124.

All or portions of the inductor $I_1$, the rectifier 118, the capacitor $C_1$, the resistor $R_1$, the controller 120, the resistor $R_2$, the charging switch 122, the second switch 124, the backlighting circuit 126 and the battery 110 can be part of a portable electronic device 128. In one arrangement, the charging system 100 can be a wireless charging system in which the rectifier 118 and the secondary coil 116 of the inductor $I_1$ are part of the portable electronic device 128. Of course, the invention is not limited in this regard, as the charging system 100 can be a conventional charging system in which the inductor $I_1$ and the rectifier 118 are part of a standard charger that can be coupled to the portable electronic device 128.

The power source 112 can provide power to the first coil 114 of the inductor $I_1$, which can cause a current to be generated in the second coil 116 of the inductor $I_1$. The rectifier 118 can then rectify this input power supply signal. The rectifier 118 can be either a half-wave or a full-wave rectifier. The input power supply signal can pass through the charging switch 122 to charge the battery 110 or can pass through the second switch 124 to provide power to the backlighting circuit 126.

In one arrangement, the controller 120 can have a pair of inputs 130, 132, which can be used to permit the controller 120 to monitor the input power supply signal. Although not shown, the inputs 130, 132 can be coupled to analog-to-digital converters, which can convert the input power supply signal to a digital input to permit the controller 120 to process the signal. As an example, the controller 120, through the inputs 130, 132, can determine the voltage level of the input power supply signal, which may continue to fluctuate after the supply signal has been rectified. Based on this determination, the controller 120 can also determine the amount of current flowing through the resistor $R_2$, as the value of the resistor $R_2$ can be programmed into the controller 120.

Because the controller 120 monitors the input power supply signal, the controller 120 can selectively control the operation of the charging switch 122 and the second switch 124 based on the voltage level of the input power supply signal. As an example, if the voltage level of the input power supply signal drops to a predetermined level, the controller 120 can turn off or deactivate the charging switch 122 and/or the second switch 124. When the voltage level of the input power supply signal reaches the predetermined level, the controller 120 can turn on or activate the charging switch 122 and/or the second switch 124. In view of this arrangement, the capacitor $C_1$ is not required to deliver the charging current to the battery 110 when the voltage level of the input power supply signal drops to and below the predetermined level. As a result, the value of the capacitor $C_1$, and hence its physical dimensions, can be reduced as compared to a capacitor $C_2$ that would provide charging current when the input power supply signal drops below the predetermined level.

In one arrangement, the capacitor $C_1$ can have a value high enough to hold the voltage level of the input power supply signal to a minimum value to prevent the controller 120 from disabling the charging sequence when the input power supply signal drops to the predetermined level. The capacitor $C_1$ can also provide current to a logic circuit 134 when the input power supply signal drops to and below the predetermined level. If the power source 112 is removed, e.g., when the battery 110 is fully charged, the capacitor $C_1$ can discharge though the resistor $R_1$. The operation of the charging system 100 will be further described below.

Figure 2:
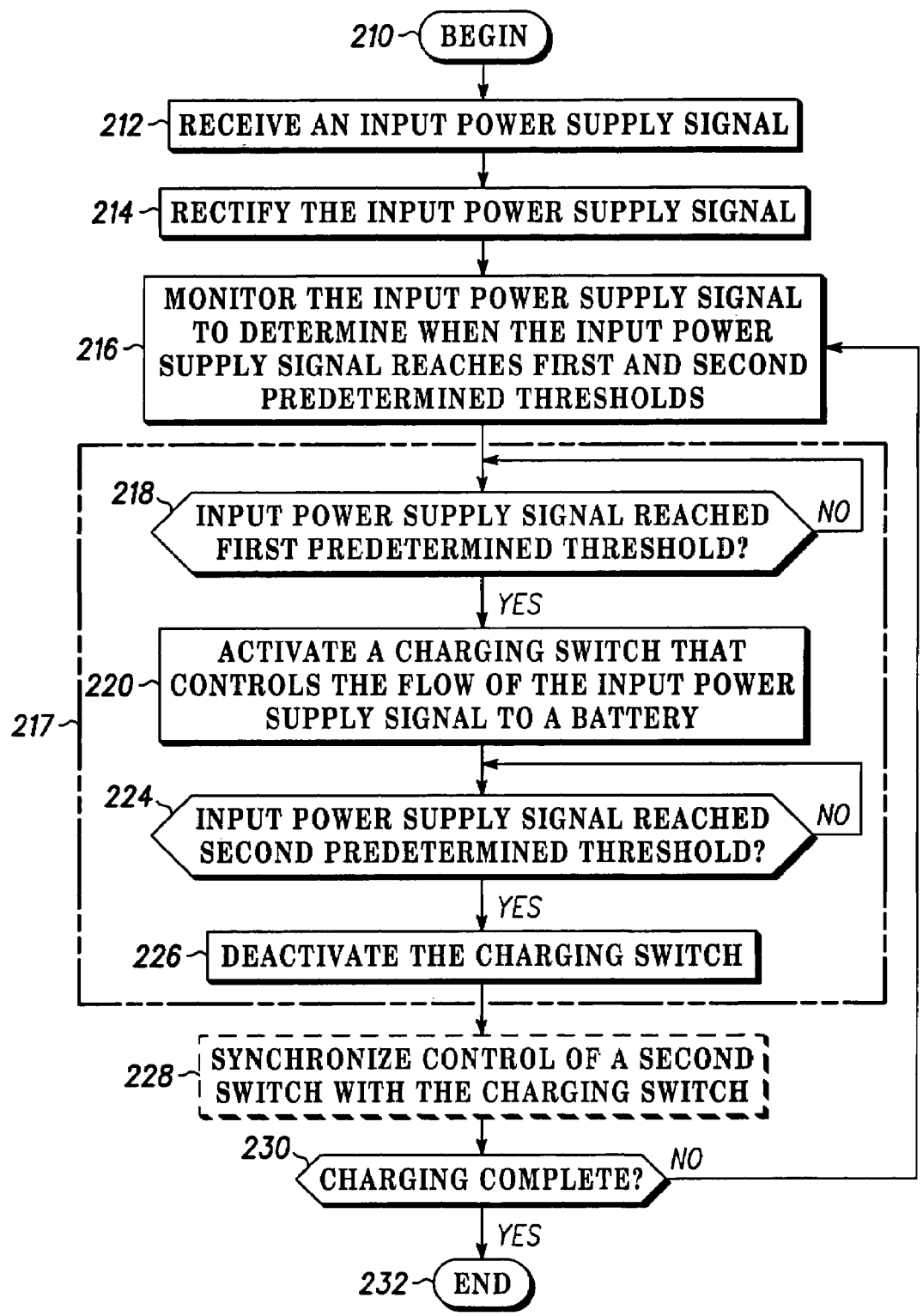
FIG. 2 illustrates a method for charging a battery, which can be practiced in, for example, the system of FIG. 1 in accordance with the inventive arrangements.

Referring to FIG. 2, a method 200 of charging a battery is shown. To explain the method 200, reference will be made to the system 100 illustrated in FIG. 1, although it must be noted that the method 200 can be practiced in any other suitable system. At step 210, the method 200 can begin. At step 212, an input power supply signal can be received. This input power supply signal can be used to charge one or more batteries, such as the battery 110 of FIG. 1, although it may be used for other suitable purposes, too. In one arrangement, the input power supply signal can be an AC signal, and the input power supply signal can be rectified, as shown at step 214.

At step 216, the input power supply signal can be monitored to determine when the input power supply signal reaches first and second predetermined thresholds. As an example and as explained earlier, the controller 120 can monitor the voltage level of the input power supply signal through the inputs 130, 132. At decision block 218, it can be determined whether the input power supply signal has reached a first predetermined threshold. If it has not, then the method 200 can continue at decision block 218. If it has, a charging switch that controls the flow of the input power supply signal to a battery can be activated, as shown at step 220.

Figure 3:
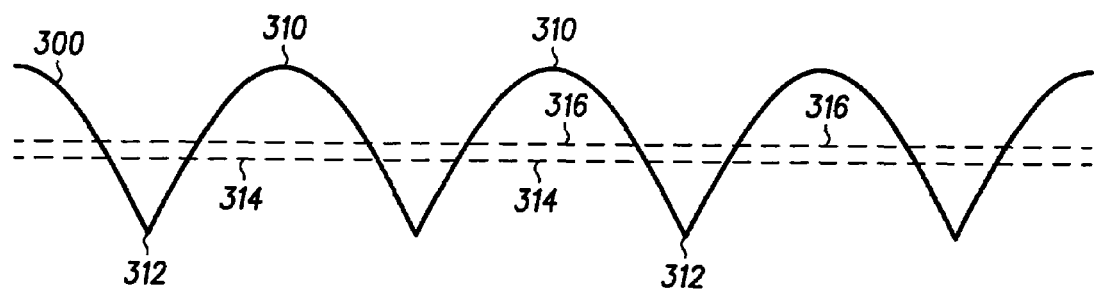
FIG. 3 illustrates an example of a rectified input power supply signal in accordance with the inventive arrangements.

Referring to FIG. 3, an example of a rectified input power supply signal 300 is shown. A first predetermined threshold 314 and a second predetermined threshold 316, both of which can be predetermined voltage levels, are also illustrated. The input power supply signal 300 can have a series of peaks 310 and valleys 312 in which the peaks 310 represent a maximum voltage of the signal 300 and the valleys 312 represent a minimum voltage of the signal 300. As an example and referring to FIGS. 1 and 3, when the input power supply signal 300 reaches a first predetermined threshold 314, the controller 120 can activate the charging switch 122. When activated, the charging switch 122 can permit the input power supply signal to charge the battery 110.

Referring to method 200 of FIG. 2 once again, at decision block 224, it can be determined whether the input power supply signal has reached the second predetermined threshold. If it has not, the method 200 can resume at decision block 224. If it has, the charging switch can be deactivated, as shown at step 226. As an example and referring back to FIGS. 1 and 3, when the input power supply signal 300 reaches the second predetermined threshold 316, the controller 120 can deactivate the charging switch 122, which can stop the input power supply signal 300 from reaching the battery 110. Moving back to FIG. 2, the steps 220 and 226 and the decision blocks 218 and 224 can be considered part of a selectively controlling the charging switch step 217.

In one arrangement, referring to FIGS. 1 and 3, the values of the first predetermined threshold 314 and the second predetermined threshold 316 can be based, at least in part, on the minimum acceptable voltage required to indicate to the controller 120 that a power supply 112 is attached. This indication can prevent the controller 120 from unintentionally disabling a charging sequence. That is, so long as the voltage level that the controller 120 senses through the inputs 130, 132 remains above the first predetermined threshold 314 and the second predetermined threshold 316, the controller 120 will sense that the power supply 112 remains present, and the controller 120 will not disable the charging sequence. The values of the first predetermined threshold 314 and the second predetermined threshold 316 can be programmed into the controller 120.

Selectively activating and deactivating the charging switch 122 in accordance with the above discussion can reduce the value of the capacitor $C_1$. More specifically, the minimum value of the capacitor $C_1$ can be reduced to the value required for the capacitor $C_1$ to maintain the voltage necessary to indicate to the controller 120 that the portable electronic device is being charged. This reduction in value is made possible primarily because the capacitor $C_1$ no longer has to maintain a voltage level to continue the charging of the battery 110 when the input power supply signal 300 decreases. The minimum value required of the capacitor $C_1$ can be reduced as compared to the minimum value required of a capacitor $C_2$ that would supply charging current when the input power supply signal 300 drops below the second predetermined threshold 316.

In one arrangement, the second predetermined threshold 316 may have a different value than the magnitude of the first predetermined threshold 314. For example, the second predetermined threshold 316 may have a higher value than the first predetermined threshold 314. Deactivating the charging switch 122 at a value higher than when it was activated can permit the capacitor $C_1$ to supply current to, for example, the logic circuit 134 that is part of the portable electronic device 128 when the input power supply signal 300 drops during its voltage valleys 312. Because of the increased value of the second predetermined threshold 316, the capacitor $C_1$ is also able to maintain the voltage necessary to indicate to the controller 120 that the portable electronic device 128 is still being charged.

Of course, the invention is not limited in this regard, as the first predetermined threshold 314 and the second predetermined threshold 316 can be determined through any other suitable process. Moreover, the magnitude of the second predetermined threshold 316 can be equal to or even less than the magnitude of the first predetermined threshold 314. The capacitor $C_1$ can also provide current to any other suitable circuitry or component in the portable electronic device 128. Alternatively, the capacitor $C_1$ can be used merely to maintain the voltage level needed to indicate to the controller 120 that the device 128 is still being charged.

Referring back to the method 200 of FIG. 2, at option step 228, the control of a second switch can be synchronized with the control of the charging switch. For example, referring once again to FIGS. 1 and 3, the second switch 124 can be activated and deactivated in accordance with the process described above. Thus, the controller 120 can activate the second switch 124 when the controller 120 activates the charging switch 122; additionally, the controller 120 can deactivate the second switch 124 when the controller 120 deactivates the charging switch 122. Synchronizing the operation of the second switch 124 with the control of the charging switch 122 can further reduce the value of the capacitor $C_1$ because the capacitor $C_1$ is not required to provide current to a circuit, such as the backlighting circuit 126. It is understood, however, that step 228 (see FIG. 2) is optional and that any number of second switches 124 can be coupled to any number of other suitable circuits or components.

Referring back to the method 200 of FIG. 2, at decision block 230, it can be determined whether the charging process is complete. If it is not, the method 200 can resume at step 216. If it is, the method 200 can continue at step 232, where the method 200 can end. For example, referring to FIG. 1, the power source 112 can be removed and the controller 120 will eventually sense the drop in voltage. In response, the controller 120 can disengage the charging sequence, and the capacitor $C_1$ can drain through the resistor $R_1$.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging a battery, comprising the steps of:
receiving an input power supply signal that is used to charge a battery, wherein the input power supply signal continues to fluctuate after its receipt;
monitoring a voltage level of the input power supply signal to determine when the fluctuating input power supply signal reaches first and second predetermined thresholds; and
in response to said monitoring step, selectively controlling a charging switch that controls the flow of the input power supply signal to the battery, wherein said controlling step comprises activating the switch when the voltage level of the input power supply signal increases to reach the first predetermined threshold and deactivating the switch when the voltage level of the input power supply signal decreases to reach the second predetermined threshold.

2. The method according to claim 1, further comprising maintaining, through a capacitor, the voltage level of the input power supply signal to indicate that the electronic device is being charged.

3. The method according to claim 1, further comprising the step of synchronizing with said controlling of the charging switch the control of a second switch that regulates current flow to a circuit such that the second switch to the circuit is activated when the charging switch is activated and deactivated when the charging switch is deactivated.

4. The method according to claim 3, wherein the synchronizing step further comprises synchronizing with said controlling of the charging switch the control of the second switch that regulates current flow to a backlighting circuit such that the second switch to the backlighting circuit is activated when the charging switch is activated and deactivated when the charging switch is deactivated.

5. The method according to claim 1, further comprising the step of performing said receiving, monitoring and controlling steps in a wireless charging system.

6. The method according to claim 1, further comprising the step of rectifying the input power supply signal.

7. The method according to claim 1, wherein the magnitude of the second predetermined threshold is higher than the magnitude of the first predetermined threshold.

8. A method of charging a battery, comprising the steps of:
receiving an input power supply signal in an electronic device having a capacitor with a value high enough to maintain a voltage level of the input power supply signal to indicate that the electronic device is being charged to prevent disabling of a charging sequence for the battery;
monitoring the voltage level of the input power supply signal to determine when the voltage level of the input power supply signal reaches first and second predetermined thresholds;
selectively controlling a charging switch that controls the flow of the input power supply signal to the battery, wherein said controlling step comprises activating the switch when the voltage level of the input power supply signal increases to reach the first predetermined threshold and deactivating the switch when the voltage level of the input power supply signal decreases to reach the second predetermined threshold, wherein the magnitude of the second predetermined threshold is lower than the magnitude of the first predetermined threshold.

9. A charging system for charging a battery, comprising:
an input for receiving an input power supply signal, wherein the input power supply signal continues to fluctuate after the input receives the input power supply signal;
a charging switch for controlling the flow of said input power supply signal to said battery; and
a controller, wherein said controller is operable to:
monitor a voltage level of said fluctuating input power supply signal to determine when the voltage level of said input power supply signal reaches first and second predetermined thresholds; and
in response to the monitoring process, selectively control said charging switch by activating said charging switch when the voltage level of said input power supply signal increases to reach said first predetermined threshold and by deactivating said switch when the voltage level of said input power supply signal decreases to reach said second predetermined threshold.

10. The charging system according to claim 9, further comprising a capacitor that maintains the voltage level of the input power supply signal that said controller monitors to determine that said battery is being charged.

11. The charging system according to claim 9, further comprising a circuit and a second switch that regulates current flow to said circuit, said second switch being under the control of said controller, wherein said controller is further programmed to synchronize with the controlling of said charging switch the control of said second switch such that said controller activates said second switch when said charging switch is activated and disables said second switch when said charging switch is deactivated.

12. The method according to claim 11, wherein said circuit is a backlighting circuit.

13. The charging system according to claim 9, wherein said charging system is a wireless charging system.

14. The charging system according to claim 9, further comprising a rectifier, wherein said rectifier rectifies said input power supply signal.

15. The charging system according to claim 9, wherein the magnitude of said second predetermined threshold is higher than the magnitude of said first predetermined threshold.

* * * * *